March 24, 1959  F. O. SWANSON  2,878,824
WATERING SYSTEM FOR PLANTS AND THE LIKE
Filed March 18, 1958  2 Sheets-Sheet 1
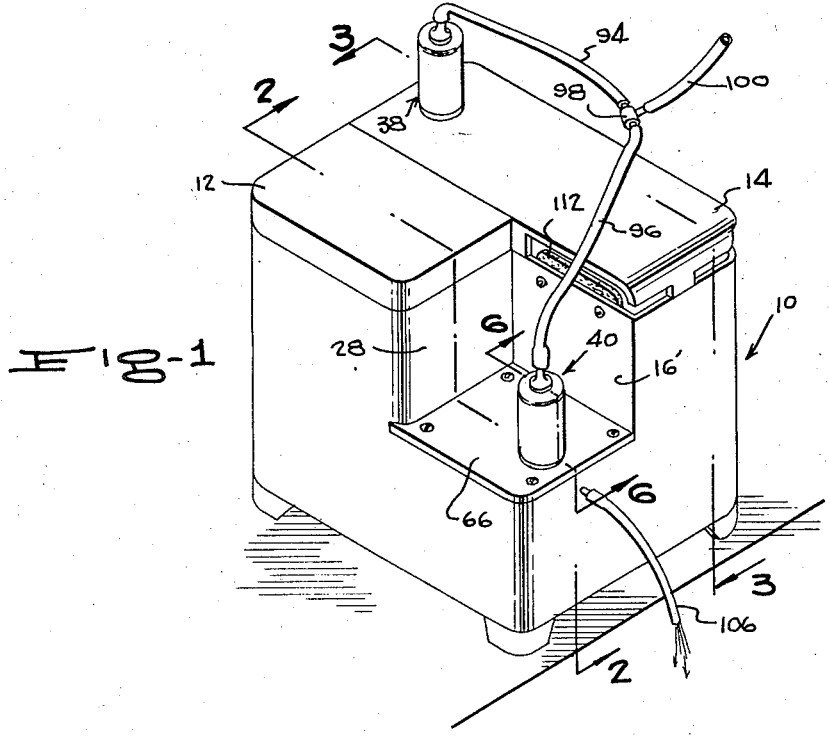
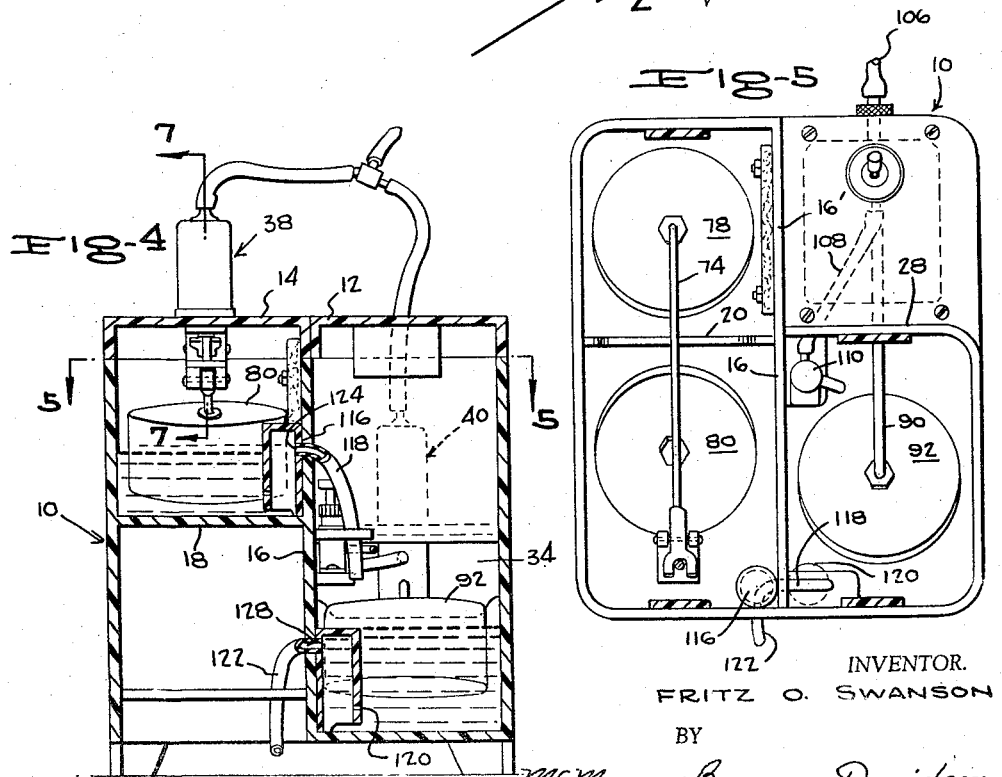
INVENTOR.
FRITZ O. SWANSON
BY
McMorrow, Berman & Davidson
ATTORNEYS

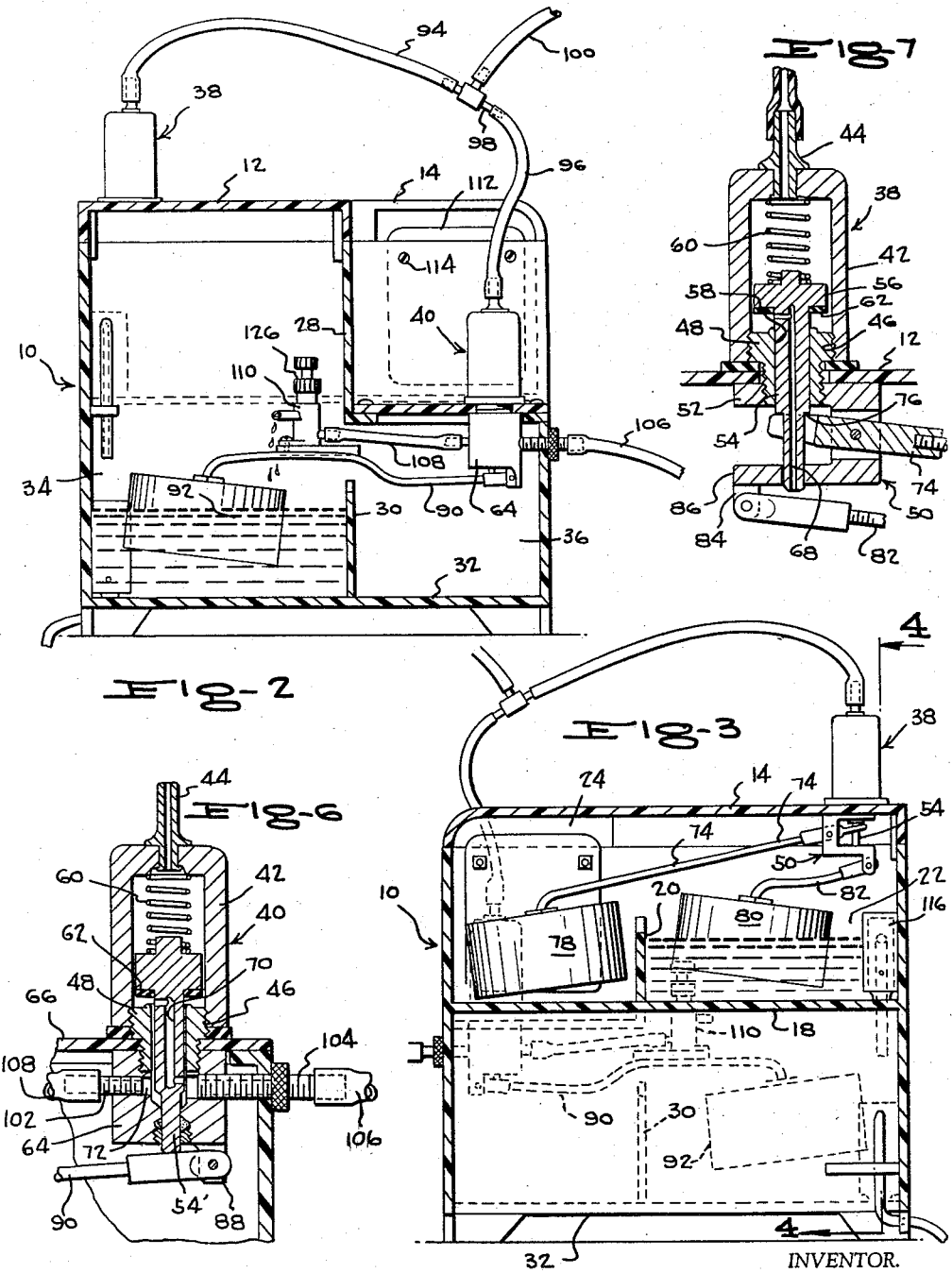

United States Patent Office 2,878,824
Patented Mar. 24, 1959

2,878,824

WATERING SYSTEM FOR PLANTS AND THE LIKE

Fritz Oliver Swanson, Astoria, N.Y.

Application March 18, 1958, Serial No. 722,254

3 Claims. (Cl. 137—78)

The present invention relates generally to watering systems and in particular to a watering system for plants and the like in residences, greenhouses, and in other locations where it is desirable to apply water at periodic intervals controlled by the rate of evaporation of the water from the soil about the plants at such locations.

An object of the present invention is to provide an automatic watering system which lends itself to efficient operation without attention or servicing, one which responds to the evaporation rate of the air in the area of the plant to be watered for control of the watering system, and one which may be adjusted for varying the time interval of each periodic watering.

A further object of the present invention is to provide a watering system for plants and the like which may be constructed in any size desired without impairment of its efficiency, one which is simple in structure, one sturdy in construction and having a minimum of parts, one having relatively long-life characteristics, and one which is economically feasible.

These and other objects and advantages of the present invention will be fully apparent from the following description when taken in conjunction with the annexed drawings, in which:

Figure 1 is an isometric view of the watering system of the present invention;

Figure 2 is a sectional view, on an enlarged scale, taken on the line 2—2 of Figure 1;

Figure 3 is a view, on an enlarged scale, taken on the line 3—3 of Figure 1;

Figure 4 is a view taken on the line 4—4 of Figure 3;

Figure 5 is a view taken on the line 5—5 of Figure 4;

Figure 6 is a view, on an enlarged scale, taken on the line 6—6 of Figure 1; and Figure 7 is a view, on an enlarged scale, taken on the line 7—7 of Figure 4.

Referring in greater detail to the drawings in which like numerals indicate like parts throughout the several views, in Figure 1 it will be seen that the system of the present invention is encased within and carried by a housing 10. The housing 10 has an open top normally closed by a cover having two sections 12 and 14. The housing 10 constitutes a tank having three wet compartments and a dry compartment separated by full partitions and half partitions. A full partition 16 extends from one end of the housing 10 to the other end and has a portion 16' defining one outside wall of the housing 10 at a cutaway corner of the housing 10. A floor 18 extends from one end of the housing 10 to the other end on one side of the partition 16 and subdivides that portion of the housing 10 into an upper portion and a lower portion. A half partition 20 projects perpendicularly to the partition 16 and rises from the floor 18 intermediate the ends of the housing 10 and subdivides the upper portion of that half of the housing 10 into a first receiving or reservoir compartment 22 and a second or control compartment 24. In substantially longitudinal alignment with a half partition 20, and on the opposite side of the partition 16, is a transverse partition 28 extending from the open top of the housing 10 to substantially the same level as the floor 18 and terminating in an outwardly projecting flange. The transverse partition 28 forms another outside wall of the housing 10 at the cutaway corner. Another half partition 30 rises from the bottom 32 of the housing 10 and terminates at a point spaced from the lower end of the partition 28 and subdivides the section of the housing 10 on that side of the partition 16 into a third or fluid flow regulating compartment and a fourth or dry compartment. A fluid flow regulating compartment is designated by the reference numeral 34 and the dry compartment is designated by the numeral 36 in Figure 2.

A first openable and closable valve means 38 is in communication with the reservoir compartment 22 and a second openable and closable valve means 40 is in communication with the fluid flow compartment 34. The valve means 38 is shown in detail in Figure 7 and consists in an upright inverted cup member 42 having a nipple 44 extending through the bottom thereof. The open end of the cup member 42 is provided with internal threads, as at 46, threadedly engaging the adjacent portion of a plug 48 closing the open end of the cup member 42 and having a reduced portion extending through the cover 12. A horizontally disposed U-shaped bracket 50 has one leg 52 in abutting engagement with the underface of the cover 12 and provided with a threaded opening receiving the threaded reduced portion of the plug 48 for securement of the valve means 38 to the cover 12. The stem 54 of a valve element 56 extends slidably through a bore 58 provided in the plug 48. A coil spring 60 has one end bearing against the bottom of the cup member 42 and the other end bearing against the upper end of a valve element 56 and normally biases the valve element 56 to the closed position with a sealing washer 62 bearing against the upper end of the plug 48.

In Figure 6 it will be seen that the valve means 40 is identical in construction with the valve means 38 with the exception that the lower end portion of the plug 48 is threaded into a distribution block 64 for securement of the valve means 40 to a plate 66 which extends over the upper open end of the dry compartment 36. Also, the valve stem 54 has a passage 68 extending from its lower end to a point beneath the washer 62 while the valve stem 54' in the valve means 40 has a passage 70 extending from a point beneath the washer 62 to a point spaced inwardly of the lower end thereof and in communication with a transverse passage 72 provided in the block 64.

Referring again to Figure 7, a lever 74 is pivotally supported intermediate its ends in the bight of the bracket 50 and has one end bifurcated and extending on each side of the portion of the valve stem 54 below a shoulder 76 provided thereon. As shown in Figure 3, a float 78 is carried on the other end of the lever 74. Another float 80 is carried upon the free end of an arm 82 which has its end remote from the float 80 pivotally connected to a pair of lugs 84 carried on the free end of the other leg 86 of the bracket 50.

Referring again to Figure 6, the block 64 dependingly carries a pair of lugs 88 pivotally connecting one end of another float arm 90 to the block 64. Another float 92 is carried upon the other end of the float arm 90, as shown in Figure 2.

Lengths of tubing 94 and 96 connect the nipples 44 to a key connector 98 having its stem connected by a conduit 100 to a source of water under pressure. Into opposite ends of the passage 72 and the block 64 are threaded nipples 102 and 104. A dispensing conduit 106, fabricated of flexible tubing, has one end secured to the free end of the nipple 104 and its other end at a location adjacent the plant to be watered, the latter not being shown as not being a part of the present invention.

A short length of tubing 108 connects the free end of the nipple 102 to a bleeder valve body 110 positioned on a shelf projecting inwardly of the partition 16 and within the fluid flow compartment 34, as shown in Figure 2. The end of the float arm 90 adjacent the lugs 88 bears upwardly against the lower end of the stem 54'.

Means is provided for defining a first predetermined level of fluid within the control compartment 24 below the full capacity of the reservoir compartment 22, this means embodying the half partition 20 which subdivides that portion of the housing 10 into the reservoir compartment 22 and the control compartment 24.

Means is provided communicating with the control compartment 24 for assisting fluid contained therein to evaporate into the atmosphere. Specifically, this means consists in an upright ceramic body 112 secured by conventional means such as small bolts 114 to the adjacent portion of the partition 16 and having its lower end adjacent to and spaced above the floor 18.

The float 78 and its connection to the lever 74, and the connection of the lever 74 with the shoulder on the valve stem 54, constitutes a first level responsive control means operatively connected to the valve means 38 and disposed in the control compartment 24 for opening the valve means 38 and permitting fluid to enter the reservoir compartment 22 and the control compartment 24 when the fluid in the control compartment 24 reaches a second predetermined level. This second predetermined level is lower than the upper end of the half partition 20.

The float 80 with its connection to the arm 82 and the abutting engagement of the end of the arm 82 remote from the float 80 with the lower end of the valve stem 54, constitutes a second level responsive control means in the reservoir compartment 22 operatively connected to the valve means 38 for retaining the valve means 38 in an open position to obtain the first predetermined level in both the reservoir compartment 22 and the control compartment 24.

A vertically disposed tubular member 116 is fixedly secured to the end walls of the housing 10 and to the one side of the partition 16 adjacent such end wall and has its upper end closed and its lower end open and spaced above the floor 18, as shown in Figure 3. A tube 118 connects the interior of the tubular member 116 with the fluid flow regulating compartment 34, as shown in Figure 4. Another tubular member 120 is arranged in an upright direction and is fixedly secured to the same end wall and to the other side of the partition 16 and has its upper end closed and its lower end open and spaced above the housing bottom 32, as seen in Figure 4. A tube 122 has one end connected to the interior of the tubular member 120 and the other end leading to a place of disposal of the water when contained in the fluid flow regulating compartment 34.

The tubular members 116 and 120, together with their associated discharge tubes 118 and 122, constitute first and second syphon means communicating between the reservoir compartment 22 and the fluid flow regulating compartment 34 for automatically emptying the reservoir compartment 22 into the regulating compartment 34 responsive to the reaching of a level above the first predetermined level or the level of fluid at the upper end of the half partition 20, and a second syphon means connecting with the fluid flow regulating compartment 34 for automatically emptying the regulating compartment 34 responsive to the reaching of a fluid level above the aforesaid third predetermined level within the fluid flow regulating compartment 34, respectively.

In operation, initially all of the compartments within the housing 10 are empty and with the conduit 100 connected to a source of water under pressure, water is permitted to flow into each of the valve means 38 and 40, the latter valve means being closed and the former being open. As water flows into the reservoir compartment 22 and over the top of the partition 20 into the control compartment 24 the floats 78 and 80 are raised. The outlet 124 in the tubular member 116 is at a point spaced below the upper end of the partition 20. This causes the water in the reservoir compartment 22 to be syphoned out of the compartment 22 and discharged into the fluid flow regulating compartment 34 upon reaching the level above the port 124. The level of water within the control compartment 24 will remain at the upper end of the half partition 20 and the valve stem 54 will no longer be lifted by the engagement of the adjacent end of the lever 74 with the shoulder on the valve stem 54. Also, the arm 82 will no longer engage the lower end of the valve stem 54. Thus, the valve element 56 within the valve means 38 will be closed on the washer 62 sealing off further flow of liquid into the control and reservoir compartments. The water within the reservoir compartment 22 is now in the fluid flow regulating compartment 34 and the float 92 has been raised to a position in which the other end of the arm 90 bears upwardly on the lower end of the valve stem 54' to raise the associated valve element from the upper end of the plug 48. This results in flow of the water from the conduit 100 through the conduit or tubing length 96 through the valve means 40 and through the nipple 104 to the dispensing conduit 106 to the plants to be watered.

This flow to the plants to be watered will continue until some means is provided for lowering the float 92 within the fluid flow regulating compartment 34. This means consists in a small trickle of water through the bleeder valve 110 into the fluid flow regulating compartment 34 as regulated by screwing in or screwing out the adjusting valve stem 126 in the bleeder valve 110. The outlet port 128 in the upper end of the tubular member 120 is at a level above the level which is reached by the emptying of the reservoir compartment 22. The operation of the bleeder valve 110 to admit more water to the fluid flow regulating compartment 34 constitutes a fluid flow interval control means for the second valve means 40 and controls the time interval of the fluid flow through the dispensing conduit 106. As water is admitted through the bleeder valve to the compartment 34, the level will be reached at which the port 128 is covered by the water level and syphoning action takes place in the tubular member 120 to completely empty the reservoir compartment 34, dropping the float 92 and closing the valve means 40 and shutting off flow of fluid through the dispensing conduit 106.

After the water within the control compartment 24 has evaporated by the assistance of the ceramic body 112 which enables the air around the housing 10 to take up moisture, the lever 74 will again operate to raise the valve stem 54 and admit another charge of water into the reservoir compartment 22 and into the control compartment 24 to recycle the apparatus as set forth above.

Obviously, a long interval of supplying water to the plants to be watered may be had by adjusting the flow from the bleeder valve 110 to a mere stream of droplets spaced over a period of time as desired. Flow of water through the bleeder valve 110 at a faster rate will shorten the interval at which water flows to the plants from the dispensing conduit 106.

What is claimed is:

1. In a water system for periodically and automatically watering plans, a tank including a reservoir compartment, a control compartment in communication with said reservoir compartment, and a fluid flow regulating compartment in communication with said reservoir compartment, a first openable and closable valve means communicating with said reservoir compartment and normally biased to closed position, a second openable and closable valve means communicating with said fluid flow regulating compartment and normally biased to closed position, a source of fluid under pressure, conduit means directly connecting said source to both of said valve means, a dispensing conduit connected to said second valve means for conveying the fluid to a plant to be watered, means for defining a first predetermined level of fluid within said control compartment below the full capacity of the reservoir compartment, means communicating with the control compartment assisting fluid contained therein to evaporate into the atmosphere, a first level responsive control means operatively connected to said first valve means and disposed in said control compartment for opening said first valve means and permitting fluid to enter the reservoir and control compartments when the fluid in the control compartment reaches a second predetermined level, a second level responsive control means in said reservoir compartment operatively connected to said first valve means for retaining the last-mentioned valve means open to obtain said first predetermined level in both of said reservoir and control compartments, a first syphon means communicating between said reservoir and fluid flow regulating compartments for automatically emptying said reservoir compartment into said regulating compartment responsive to the reaching of a fluid level above said first predetermined level, a third level responsive control means in said regulating compartment operatively connected to said second valve means for shifting and maintaining the last-mentioned valve means to and in open position in response to a third predetermined fluid level attained in said regulating compartment, and a second syphon means communicating with said regulating compartment for automatically emptying said regulating compartment responsive to the reaching of a fluid level above said third predetermined level.

2. In a water system for periodically and automatically watering plants, a tank including a reservoir compartment, a control compartment in communication with said reservoir compartment, and a fluid flow regulating compartment in communication with said reservoir compartment, a first openable and closable valve means communicating with said reservoir compartment and normally biased to closed position, a second openable and closable valve means communicating with said fluid flow regulating compartment and normally biased to closed position, a source of fluid under pressure, conduit means directly connecting said source to both of said valve means, a dispensing conduit connected to said second valve means for conveying the fluid to a plant to be watered, means for defining a first predetermined level of fluid within said control compartment below the full capacity of the reservoir compartment, means communicating with the control compartment assisting fluid contained therein to evaporate into the atmosphere, a first level responsive control means operatively connected to said first valve means and disposed in said control compartment for opening said first valve means and permitting fluid to enter the reservoir and control compartments when the fluid in the control compartment reaches a second predetermined level, a second level responsive control means in said reservoir compartment operatively connected to said first valve means for retaining the last-mentioned valve means open to obtain said first predetermined level in both of said reservoir and control compartments, a first syphon means communicating between said reservoir and fluid flow regulating compartments for automatically emptying said reservoir compartment into said regulating compartment responsive to the reaching of a fluid level above said first predetermined level, a third level responsive control means in said regulating compartment operatively connected to said second valve means for shifting and maintaining the last-mentioned valve means to and in open position in response to a third predetermined fluid level attained in said regulating compartment, a second syphon means communicating with said regulating compartment for automatically emptying said regulating compartment responsive to the reaching of a fluid level above said third predetermined level, and fluid interval control means operatively connected to said second valve means and said regulating compartment for controlling the time interval of the fluid flow from said dispensing conduit.

3. In a water system for periodically and automatically watering plants, a tank including a reservoir compartment, a control compartment in communication with said reservoir compartment, and a fluid flow regulating compartment in communication with said reservoir compartment, a first openable and closable valve means communicating with said reservoir compartment and normally biased to closed position, a second openable and closable valve means communicating with said fluid flow regulating compartment and normally biased to closed position, a source of fluid under pressure, conduit means directly connecting said source to both of said valve means, a dispensing conduit connected to said second valve means for conveying the fluid to a plant to be watered, means for defining a first predetermined level of fluid within said control compartment below the full capacity of the reservoir compartment, means communicating with the control compartment assisting fluid contained therein to evaporate into the atmosphere, a first level responsive control means operatively connected to said first valve means and disposed in said control compartment for opening said first valve means and permitting fluid to enter the reservoir and control compartments when the fluid in the control compartment reaches a second predetermined level, a second level responsive control means in said reservoir compartment operatively connected to said first valve means for retaining the last-mentioned valve means open to obtain said first predetermined level in both of said reservoir and control compartments, a first syphon means communicating between said reservoir and fluid flow regulating compartments for automatically emptying said reservoir compartment into said regulating compartment responsive to the reaching of a fluid level above said first predetermined level, a third level responsive control means in said regulating compartment operatively connected to said second valve means for shifting and maintaining the last-mentioned valve means to and in open position in response to a third predetermined fluid level attained in said regulating compartment, a second syphon means communicating with said regulating compartment for automatically emptying said regulating compartment responsive to the reaching of a fluid level above said third predetermined level, and fluid interval control means operatively connected to said second valve means and said regulating compartment for controlling the time interval of the fluid flow from said dispensing conduit, said fluid control means including a selectively adjustable bleeder valve positioned within said regulating compartment, and conduit means connecting said bleeder valve to said second valve means.

No references cited.